United States Patent Office 3,737,375
Patented June 5, 1973

3,737,375
**PROCESS FOR THE PRODUCTION OF
6-AMINOPENICILLANIC ACID**
Ernst Brandl, Walter Kleiber, and Franz Knauseder, Tirol,
Austria, assignors to BIOCHEMIE Gesellschaft m.b.H.,
Vienna, Austria
No Drawing. Filed Nov. 25, 1970, Ser. No. 92,955
Claims priority, application Austria, Nov. 28, 1969,
11,148/69
Int. Cl. C12d 9/00
U.S. Cl. 195—36 P            7 Claims

ABSTRACT OF THE DISCLOSURE

The invention concerns a novel cleavage process for the production of 6-aminopenicillanic acid, which comprises contacting a penicillin of the formula:

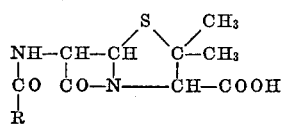

wherein R is phenoxymethyl, p-cresoxymethyl or n-butoxymethyl, or an alkali metal salt of said pencillin, with penicillin amidase produced by culturing under aerobic conditions Bovista plumbea (NRRL 3501) or a mutant or variant thereof in an aqueous medium containing assimilable sources of carbon and nitrogen.

---

This invention relates to a cleavage process for the production of 6-aminopenicillanic acid. More particularly, the invention concerns said cleavage process which comprises contacting a penicillin with penicillin amidase.

Cleavage of a penicillin by contacting with penicillin amidase is known. Strains of the class of schizomycetes (species of the order of Actinomycetales), phycomycetes and ascomycetes are known to be capable of producing penicillin amidase. It is also known that one strain of the class of basidiomycetes, namely Pleurotus ostreatus, belonging to the order of Hymenomycetales, family of Polyproaceae, is capable of producing penicillin amidase.

It has now surprisingly been found that the strain Bovista plumbea, and variants and mutants thereof, are useful for producing penicillin amidase. Bovista plumbea belongs to the family Lycoperdaceae, order of Gastromycetales, which is systematically in a completely different position in the class of basidiomycetes than the only known penicillin amidase-producing basidiomyces. Tests with several hundred strains of the basidiomycetes class have, on the other hand, shown negative results.

A culture of the effective penicillin amidase-producing Bovista plumbea has been deposited with the Fermentation Division of the Northern Regional Research Laboratories, Peoria, Ill., and has been allocated the reference NRRL 3501. Further, a culture of a variant of said strain has also been deposited with said Laboratories and has been allocated the reference NRRL 3824.

In accordance with the invention, there is provided a cleavage process for the production of 6-aminopenicillanic acid, which comprises contacting a penicillin of the formula:

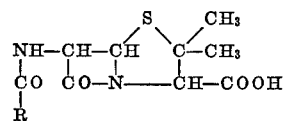

wherein R is phenoxymethyl, p-cresoxymethyl or n-butoxymethyl, or an alkali metal salt of said penicillin, with penicillin amidase produced by culturing under aerobic conditions Bovista plumbea (NRRL 3501) or a mutant or variant thereof in an aqueous medium containing assimilable sources of carbon and nitrogen.

The penicillin employed in the cleavage process is preferably potassium phenoxymethyl penicillin. The variant NRRL 3824 of Bovista plumbea (NRRL 3501) may be employed to produce the penicillin amidase.

The penicillin may be contacted with penicillin amidase-containing mycelium produced by said culturing. Further, the penicillin may be contacted with penicillin amidase which has been separated from its accompanying medium. Such separated penicillin amidase may conveniently be mixed with an inert carrier and formed into a granulate. Particles of said penicillin amidase-containing mycelium or the said granulate may be coated with a permeable film of polymeric material. The polymeric material may be polyacrylic acid resin.

The inert carrier for the penicillin amidase may, for example, be calcium carbonate, diatomaceous earth, sea sand or the like. Coated particles of the mycelium or of the granulate may, for example, be employed for the cleavage process by providing a column charged with said coated particles or granulate, and passing a solution of the penicillin through the column. The coated particles of the mycelium or of the granulate may, however, also be employed in conventional batch processes, e.g. in a fermentor tank.

It is, however, to be understood that the penicillin amidase produced by said culturing may be contained in preparations of any convenient form.

The cleavage process of the invention may, for example, be carried out after a preliminary fermentation period, e.g. after completion of the growth phase. A solution of the penicillin may be added to the actual culture medium and fermentation be allowed to continue. Similarly, the solution of the penicillin may be added to a filtrate of the culture, or to a suspension of the mycelium which has been separated from the culture, and suspended in a nutrient-free carrier, e.g. water, a common salt solution or a buffer solution. Intimate contact of the penicillin with the penicillin amidase may in this embodiment of the cleavage process be effected by shaking together the solution of the penicillin and the particular penicillin amidase-containing preparation, under aerobic conditions.

The most convenient concentration of the penicillin solution employed in the various embodiments of the cleavage process described above will of course by largely dependent on the activity or concentration of penicillin amidase. However, it is preferred that the cleavage be completed within a few hours or, at most, within about two days. The pH of the system is preferably approximately neutral, but the cleavage proceeds satisfactorily under weakly acid or weakly alkaline conditions. To avoid destruction of the penicillin or the resulting 6-aminopenicillanic acid, the penicillin amidase is preferably employed to its full capacity.

The 6-aminopenicillanic acid produced in accordance with the invention may be employed in conventional and known manner for the production of semi-synthetic penicillins. Thus, for example, semi-synthetic pencillins may be produced directly, with or without isolation or concentration of the 6-aminopenicillanic acid obtained, to producce known pencillins semi-synthetically. Thus, the 6-amino group of the 6-aminopenicillanic acid obtained may be acylated in conventional manner to obtain various semi-synthetic penicillins. For example, the 6-aminopenicillanic acid obtained may be employed to produce such semi-synthetic pencillins as ampicillin, oxacillin, gloxacillin, hetacillin and others by direct acylation with a suitable acylating agent. The advantages and uses of semi-synthetic penicillins such as are mentioned above over natural penicillins is known.

Particular manners of effecting the cleavage process of the invention are described, by way of example only, in the following examples.

EXAMPLE 1

The mycelium of a primary culture of Bovista plumbea (NRRL 3501) incubated at 24° C. for 14 days (nutrient medium: Sabouraud dextrose agar, filled in 16 x 160 mm. test tubes with a content of 5 cc., allowed to solidify in an oblique position) is rinsed with 5 cc. of the nutrient solution indicated below, is crushed in a sterile test tube with a glass rod and is transferred to a 100 cc. narrow-necked Erlenmeyer flask filled with 20 cc. of the sterile nutrient solution indicated below.

Nutrient solution:

| | G. |
|---|---|
| Nitrogen (in the form of filtered autolyzed beer yeast | 1 |
| Glucose | 50 |
| $KH_2PO_4$ | 1 |
| $MgSO_4 \cdot 7H_2O$ | 0.5 |
| $Ca(NO_3)_2$ | 0.5 |
| NaCl | 0.1 |
| $FeSO_4 \cdot 7H_2O$ | 0.05 |

Fill up to 1000 cc. with distilled water.
pH 6.0.

After filling the nutrient solution into the flask, 0.6% of sperm oil are added. The nutrient solution is sterilized at 120° C. in a steam autoclave for 40 minutes and after inoculation, is shaken at 24° C. for 96 hours on a rotating shaking machine with a stroke of 40 mm. and 260 revolutions per minute. The mycelium of this first submerged stage is spherical, and the entire culture is triturated under sterile conditions to a pulp consistency in a glass tube. 10 cc. of this triturated culture are used for inoculation of the second submerged stage (500 cc. wide-necked Erlenmeyer flask, containing 100 cc. of the nutrient solution described above). Shaking is effected at 24° C. for 96 hours on a rotating shaking machine with a stroke of 40 mm. and 260 revolutions per minute, and the culture is then homogenized with a suitable immersion mixer under sterile conditions for 3 seconds at 400–4500 revolutions per minute. For this purpose a sterilized dispersion head of the mixer is introduced into the culture vessel. 10 cc. of the homogenized product of this second submerged stage are used for inoculation of a culture vessel of the third submerged stage (500 cc. wide-necked Erlenmeyer flask, containing 100 cc. of the nutrient solution indicated above). Shaking at 24° C. for 96 hours and homogenization are effected under conditions analogous to those of the second submerged stage. Cleavage of the penicillin is effected in 500 cc. Erlenmeyer flasks, filled with 45 cc. amounts of the above sterile nutrient solution, inoculation being effected with 10% amounts of the third submerged stage described above. After shaking at 24° C. for 96 hours on a rotating shaking machine with a stroke of 40 mm. and 260 revolutions per minute, 30,000 units of potassium phenoxymethyl penicillin in solid form for every cc. of flask content are added. At 3 to 6 hour intervals small portions of the flask content are tested to determine residual penicillin or resulting 6-aminopenicillanic acid. After extraction of the penicillin, the ratio concentration of the substrate:concentration of the cleavage product is determined iodometrically. After 8 hours 94% of the penicillin used is cleaved and is present as 6-aminopenicillanic acid.

EXAMPLE 2

Submerge tanks of stainless steel, provided with shaking and aerating devices and filled with 5 litres of the nutrient solution described in Example 1, are inoculated with the inoculation material obtained as described in Example 1. After a fermentation period of 96 hours, the resulting mycelium is separated from the culture solution, is washed and suspended in 2 litres of a 0.15 molar phosphate buffer with a pH value of 7.5, whereupon a total of 100,000 units of potassium phenoxymethyl penicillin for every cc. of culture mash are added portionwise. During cleavage the pH value is automatically maintained at the initial value. After stirring and aerating for 27 hours, 90% of the pencillin used is cleaved.

EXAMPLE 3

30 cc. of polyacrylic resin coating varnish (Eudragit ® retard-s) are added to 40 g. of penicillin amidase-containing Bovista plumbea (NRRL 3501) (mycelium) which has been dried by treatment with acetone, and this is formed into a plastic mass while evaporating the solvent and kneading continually. Shortly before the mass hardens completely, it is pressed through a nylon sieve having an inside mesh width of 750μ. A mycelium which is stable in form and having sufficient mechanical firmness for the uniform filling of a column, is obtained. 35 g. of this coated, formed mycelium are suspended in 500 cc. of a phosphate buffer in accordance with Sörensen having a pH of 7.5, and this is filled into a glass column (2.5 x 50 cm.) provided with a warming jacket. The loaded column with a filling height of about 33 cm. and a volume of about 162 cc., is washed at room temperature with Sörensen's phosphate buffer having a pH of 7.5, at a speed by volume of 0.5 for 4 to 5 hours. Cleavage is effected in that a solution of about 40,000 units of potassium phenoxymethyl penicillin per cc. in a phosphate buffer with pH 7.5, containing 40 g. of $$Na_2HPO_4 \cdot 12H_2O$$

and 2.5 g. of $KH_2PO_4$ per litre, is continuously added by means of a pump to the column which has been warmed to 28° C. The speed by volume amounts to 0.3 to 0.35. The results obtained, in a continuous test are indicated in the following table:

| Running time (hours) | Substrate concentration (units/cc.) | 6-aminopenicillanic acid formed (units/cc.) | Residual penicillin (units/cc.) | Cleavage yield (percent) |
|---|---|---|---|---|
| 8 | 40,150 | 36,280 | 2,100 | 90.4 |
| 16 | 39,210 | 36,430 | 1,860 | 92.9 |
| 32 | 41,200 | 36,710 | 2,800 | 89.1 |
| 40 | 40,030 | 35,870 | 3,050 | 89.6 |
| 56 | 38,950 | 35,200 | 1,600 | 90.4 |
| 64 | 40,800 | 35,910 | 2,100 | 88.1 |
| 80 | 39,750 | 36,240 | 2,050 | 91.2 |
| 88 | 40,800 | 34,810 | 3,700 | 85.3 |
| 152 | 40,150 | 35,350 | 3,100 | 88.4 |
| 248 | 40,050 | 36,300 | 2,750 | 90.6 |

The high cleavage capacity is maintained even after 20 days of continuous operation. 6-aminopenicillanic acid may be isolated from the almost colourless cleavage solutions in accordance with usual methods.

EXAMPLE 4

2.5 cc. of a highly concentrated enzyme extract from 23 g. of Bovista plumbea mycelium (NRRL 3501) which has been dried with acetone, are mixed with 4.5 g. of filter cel (diatomaceous earth). The adsorbate is washed thrice with 50 cc. amounts of cold acetone, is dried, 9 cc. of polyacrylic resin coating varnish (Eudragit ® retard-s) are added, this is formed into a plastic mass and pressed through a nylon sieve having an inside mesh width of 500μ. The solidified granulate is suspended in Sörensen's phosphate buffer with a pH of 7.5 and this is filled into a glass colum (1.0 x 30 cm.) provided with a warming jacket. The filling height amounts to 25 cm. After washing for a short period with a phosphate buffer having a pH of 7.5, a solution of about 20,000 units of potassium phenoxymethyl penicillin per cc. in a phosphate buffer with a pH of 7.5, containing 40 g. of $NaHPO_4 \cdot 12H_2O$ and 2.5 g. of $KH_2PO_4$ per litre, is added to the column at a speed by volume of 0.2. The column is simultaneously warmed to 28° C. The results of the cleavage test are indicated in the following table:

| Running time (hours) | Substrate concentration (units/cc.) | 6-amino-penicillanic acid formed (units/cc.) | Residual penicillin (units/cc.) | Cleavage yield (percent) |
|---|---|---|---|---|
| 2 | 20,500 | 15,060 | 3,200 | 73.4 |
| 8 | 19,630 | 16,370 | 2,050 | 83.4 |
| 20 | 19,700 | 16,830 | 2,100 | 85.5 |
| 48 | 19,150 | 15,600 | 2,500 | 81.5 |
| 50 | 20,850 | 17,050 | 2,000 | 81.5 |
| 72 | 19,400 | 16,300 | 2,450 | 83.0 |

The resulting cleavage solution is colourless, and the 6-aminopenicillanic acid isolated therefrom shows a decomposition point of 206–208° C. (uncorrected) and an activity of 2740 units/mg. (iodometric).

EXAMPLE 5

One litre of a submerged culture is produced in accordance with the process described in Example 1, from a primary culture of *Bovista plumbea* variant NRRL 3824. A submerged culture tank of stainless steel provided with devices for stirring and aerating and containing 5 litres of the nutrient solution described in Example 1, is inoculated with the resulting inoculum. After a fermentation period of 72 hours, the resulting mycelium is separated from the culture solution, is washed and suspended in 3.5 litres of a 0.15 molar phosphate buffer with a pH value of 7.5, whereupon 60,000 units of potassium phenoxymethyl penicillin are added portionwise for every cc. of culture mash. During cleavage the pH value is automatically kept at 7.5. After stirring and aerating for 10 hours, 92% of the penicillin used has been cleaved.

EXAMPLE 6

60,000 units of potassium phenoxymethyl penicillin for every cc. of culture liquor are added portionwise to the culture solution obtained after separating the mycelium obtained in accordance with Example 5. During cleavage the pH value is automatically kept at 7.5. After 8 hours, 85% of the penicillin used is present as 6-aminopenicillanic acid.

EXAMPLE 7

The following results are obtained when following the process of Example 1 and using penicillins indicated in the description and others in place of potassium phenoxymethyl penicillin:

| Penicillins | Amount (units/cc.) | Cleavage period (hours) | Cleavage (percent) |
|---|---|---|---|
| Benzyl penicillin | 30,000 | 8 | 1 |
| Phenylmercaptomethyl penicillin | 30,000 | 8 | 1 |
| p-Cresoxymethyl penicillin | 30,000 | 8 | 31 |
| n-Butoxymethyl penicillin | 30,000 | 7 | 92 |

EXAMPLE 8

A steel culture tank provided with stirring and aerating devices and filled with 5 liters of the nutrient solution described in Example 1, is inoculated with 0.5 liter of a submerged culture of *Bovista plumbea* NRRL 3501, produced as described in Example 1. After a fermentation period of 96 hours, the culture mash is filtered and the pH of the culture filtrate is adjusted to about 6 by careful addition of 20% sulphuric acid. 30 g. of a silica aerogel are then added to 3 liters of filtrate, this is stirred at room temperature for 40 minutes and centrifuged. The oil which has been separated by centrifuging and which has adsorbed the cleavage enzyme, is washed thrice with 1 liter amounts of Sörensen's phosphate buffer having a pH of 7.5, is suspended in 1.5 liters of distilled water, and 45 g. of potassium phenoxymethyl penicillin are added. Enzymatic cleavage of the substrate is effected at 28° C. while stirring and adding concentrated ammonia in order to maintain the pH value at about 7.5. After a cleavage period of 6 hours, about 84% of the penicillin used have been cleaved.

What is claimed is:

1. A cleavage process for the production of 5-aminopenicillanic acid, which comprises contacting a penicillin of the formula:

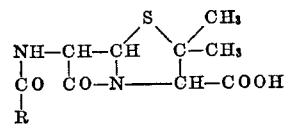

wherein R is phenoxymethyl, p-cresoxymethyl or n-butoxymethyl, or an alkali metal salt of said penicillin, with penicillin amidase produced by culturing under aerobic conditions *Bovista plumbea* (NRRL 3501) or a mutant or variant thereof in an aqueous medium containing assimilable sources of carbon and nitrogen.

2. A cleavage process for the production of 6-aminopenicillanic acid, which comprises contacting potassium phenoxymethyl penicillin with penicillin amidase produced by culturing under aerobic conditions *Bovista plumbea* (NRRL 3501) or a mutant or variant thereof in an aqueous medium containing assimilable sources of carbon and nitrogen.

3. A cleavage process according to claim 1, in which the penicillin is contacted with penicillin amidase produced by culturing under aerobic conditions the variant NRRL 3824 of *Bovista plumbea* (NRRL 3501) in an aqueous medium containing assimilable sources of carbon and nitrogen.

4. A cleavage process according to claim 1, in which the penicillin is contacted with penicillin amidase-containing mycelium formed by said culturing.

5. A cleavage process according to claim 4, in which the penicillin is contacted with particles of penicillin amidase-containing mycelium, said particles having been coated with a permeable film of polymeric material.

6. A cleavage process according to claim 1, in which the penicillin amidase has been separated from its accompanying medium, combined with an inert carrier and formed into a granulate.

7. A cleagave process according to claim 6, in which the granulate has been coated with a permeable film of polymeric material.

References Cited

UNITED STATES PATENTS 3,109,779  11/1963  Brandl et al. _____ 195—36 P
3,161,573  12/1964  Godtfredsen _____ 195—36 P ALVIN E. TANENHOLTZ, Primary Examiner U.S. Cl. X.R.

195—66, 63, 81